(12) United States Patent
Zhu et al.

(10) Patent No.: US 12,315,300 B2
(45) Date of Patent: May 27, 2025

(54) SYSTEM AND METHOD FOR PERFORMING UNIFIED HUMAN MOTION PREDICTION (HMP) FOR 2D AND 3D POSES

(71) Applicant: Guangzhou Xiaopeng Autopilot Technology Co., Ltd., Guangdong (CN)

(72) Inventors: Yanjun Zhu, Guangdong (CN); Chen Bai, Guangdong (CN); Cheng Lu, Guangdong (CN)

(73) Assignee: GUANGZHOU XIAOPENG AUTOPILOT TECHNOLOGY CO., LTD., Guangdong (CN)

( * ) Notice: Subject to any disclaimer, the term of this patent is extended or adjusted under 35 U.S.C. 154(b) by 464 days.

(21) Appl. No.: 17/967,970

(22) Filed: Oct. 18, 2022

(65) Prior Publication Data
US 2024/0144725 A1   May 2, 2024

(51) Int. Cl.
*G06V 40/20* (2022.01)
*G06T 7/20* (2017.01)
*G06T 7/73* (2017.01)
*G06V 20/64* (2022.01)

(52) U.S. Cl.
CPC ............ *G06V 40/23* (2022.01); *G06T 7/20* (2013.01); *G06T 7/75* (2017.01); *G06V 20/647* (2022.01); *G06T 2207/30196* (2013.01)

(58) Field of Classification Search
CPC ...... G06V 40/23; G06V 20/647; G06V 10/82; G06V 40/20; G06T 7/20; G06T 7/75; G06T 2207/30196; G06N 3/0442; G06N 3/0464; G06N 3/048; G06N 3/0895; G06N 3/096; G06N 3/042; G06N 3/08
See application file for complete search history.

(56) References Cited

U.S. PATENT DOCUMENTS

2020/0342270 A1*  10/2020  Biswas ................ G06V 40/103

OTHER PUBLICATIONS

3D Human Pose Estimation, Chen et al 2017 (Year: 2017).*

* cited by examiner

*Primary Examiner* — Jianxun Yang
(74) *Attorney, Agent, or Firm* — troutman Pepper Locke; Tim Tingkang Xia, Esq.

(57) ABSTRACT

A system and a method for performing unified human motion prediction (HMP) are provided. In operation, the system provides a unified HMP module, which includes an encoder configured to encode a plurality of existing two-dimensional (2D) and three-dimensional (3D) pose sequences into a shared latent space V and a decoder configured to predict a plurality of predicted future 2D and 3D pose sequences based on the encoded shared latent space V, thus forming four pathways of knowledge flow. The system then trains the unified HMP module and the shared latent space V in a weakly supervised manner with input features X with actual future 2D and 3D pose sequences by minimizing a loss between the predicted future 2D and 3D pose sequences and the actual future 3D and 3D pose sequences. Once the training is complete, the unified HMP may be performed using the trained encoded shared latent space V.

20 Claims, 6 Drawing Sheets

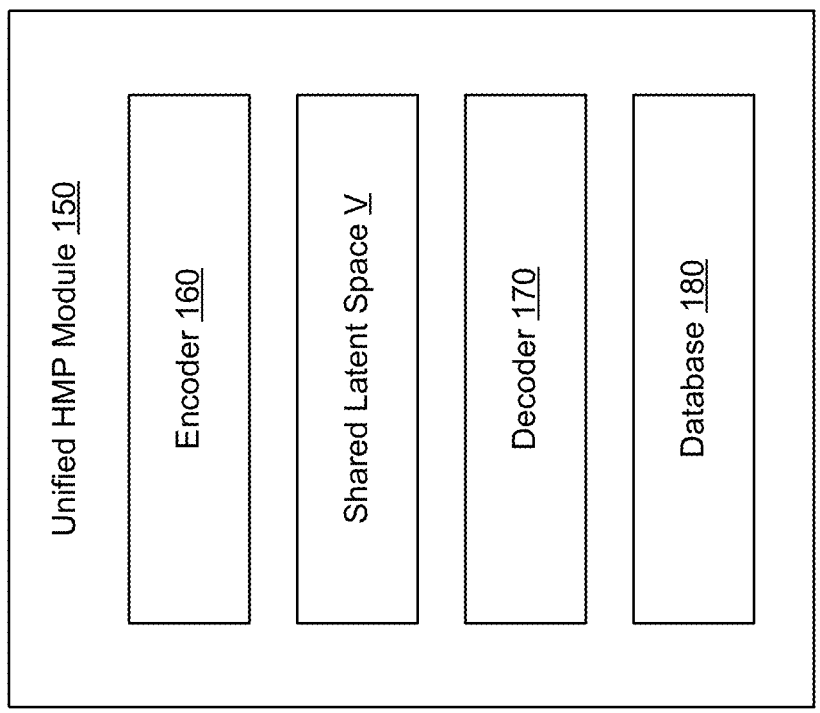

SYSTEM AND METHOD FOR PERFORMING UNIFIED HUMAN MOTION PREDICTION (HMP) FOR 2D AND 3D POSES

FIELD OF THE INVENTION

The present invention relates generally to human motion prediction technology, and more particularly to a system and a method for performing unified human motion prediction (HMP) for two-dimensional (2D) and three-dimensional (3D) poses.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Human beings naturally predict how a person will behave based on his/her previous actions, and respond accordingly with such predictions, such as emergency avoidance. To transfer the predictive ability to the machine, researchers begin studying human motion prediction (HMP) aiming to predict and plan future human motion given the past one. HMP has recently attracted attention in graphics and computer vision, with wide applications in motion synthesis, human-robot interaction, and autonomous vehicles. It can also benefit human action analysis.

Despite the great progress in motion prediction because of the advances in deep learning, it is still challenging to predict future motions accurately. One reason is that human intentions are very complex and act as internal stimuli to drive human behavior differently. On the other hand, the surroundings of the physical world can also affect human movements.

Various factors that affect human poses cannot always be exhaustively identified by modeling the context. Therefore, it requires a large amount of motion data covering a variety of situations to learn common patterns. Existing methods on HMP typically formulate it as a three-dimensional (3D) skeleton pose prediction problem, which takes past 3D skeleton pose as input and output the future 3D skeleton pose. Although state-of-the-art methods achieve promising results on public datasets such as H3.6M, they all rely on 3D annotations. Accurate 3D joint annotations are costly to obtain because they are usually collected via a sophisticated motion capture system in a controlled indoor environment. This further limits its application as people barely have such a professional equipment and well controlled environment in daily life.

Some researchers noticed this problem and proposed to take two-dimensional (2D) pose as input for human motion synthesis. They describe this problem as predicting the future poses and locations given a single scene image and 2D pose histories. They first sample multiple human motion goals, then plans 3D human paths, and finally predicts 3D human pose sequences following each path. In this way, 3D pose capture is not required as input in the inference stage. Similarly, there are some works on 3D human pose estimation (HPE) by lifting 2D poses in a supervised manner or by matching to a library of 3D poses in an unsupervised manner. They explore the feasibility of cross-modal learning on analyzing human movements.

These methods either generatively predict 3D poses from 3D inputs or regress 3D poses by lifting 2D inputs. Consequently, two problems remain unresolved. Firstly, 3D annotations are still needed for training, although not for inference. Secondly, they only provide one-way path that only allows information to be transferred from 2D to 3D. It strictly constrains the modalities of input and output, and thus its flexibility to generalize to different tasks is limited.

Therefore, a heretofore unaddressed need exists in the art to address the aforementioned deficiencies and inadequacies.

SUMMARY OF THE INVENTION

The present invention relates to a system and a method for performing unified human motion prediction (HMP), which may be used to fully bridge the gap between the two modalities, i.e., 2D and 3D poses. Specifically, the system and method may digest either 2D or 3D pose sequences to predict 2D/3D future poses, which may be applied to align the spatial-temporal 2D and 3D pose feature in the shared latent space V. It implicitly leverages 2D knowledge to 3D tasks during training (and vice versa) until the latent space reaches a stable and robust state.

In one aspect of the invention, a system for performing unified HMP is provided. In certain embodiments, the system includes a computing device having a processor and a storage device storing computer executable instructions. The computer executable instructions, when executed on the processor, cause the processor to: provide a unified HMP module, wherein the unified HMP module comprises an encoder configured to encode a plurality of existing two-dimensional (2D) and three-dimensional (3D) pose sequences into a shared latent space V and a decoder configured to predict a plurality of predicted future 2D and 3D pose sequences based on the encoded shared latent space V, and the encoder and the decoder form four pathways of knowledge flow; train the unified HMP module and the shared latent space V in a weakly supervised manner with a plurality of input features X with a plurality of actual future 2D and 3D pose sequences by minimizing a loss L between the predicted future 2D and 3D pose sequences and the actual future 2D and 3D pose sequences; and perform the unified HMP using the trained encoded shared latent space V.

In another aspect of the present invention, a method for performing unified HMP includes: providing a unified HMP module, wherein the unified HMP module comprises an encoder configured to encode a plurality of existing two-dimensional (2D) and three-dimensional (3D) pose sequences into a shared latent space V and a decoder configured to predict a plurality of predicted future 2D and 3D pose sequences based on the encoded shared latent space V, and the encoder and the decoder form four pathways of knowledge flow; training the unified HMP module and the shared latent space V in a weakly supervised manner with a plurality of input features X with a plurality of actual future 2D and 3D pose sequences by minimizing a loss L between the predicted future 2D and 3D pose sequences and the actual future 2D and 3D pose sequences; and performing the unified HMP using the trained encoded shared latent space V.

Yet another aspect of the present invention relates to non-transitory tangible computer-readable medium storing computer executable instructions which, when executed by one or more processors, cause the method as discussed to be performed.

In one embodiment, the existing 2D and 3D pose sequences are not paired pose sequences.

In one embodiment, the encoder is a graph convolutional network (GCN) module $\mathcal{F}$, the input features X include the existing 3D pose sequences $X^K=[x_1^K, x_2^K, \ldots, x_N^K]$, and the existing 2D pose sequences $X^I=[x_1^I, x_2^I, \ldots, x_N^I]$, and the shared latent space V is represented by $V=\mathcal{F}(X^I, X^K)$.

In one embodiment, the predicted future 2D and 3D pose sequences are obtained by the GCN module is represented by:

$$\hat{X}=\text{ReLU}(AXW+XU),$$

wherein ReLU represents a rectified linear activation function, A is a trainable adjacency matrix, and W and U are trainable parameters.

In one embodiment, the decoder is a graph-based gated recurrent unit (G-GRU) G, and the predicted future 2D and 3D pose sequences are:

$$\widehat{X^P}=\mathcal{G}^P(V)=\mathcal{G}^P(\mathcal{F}(X^I,X^K)), \text{ and}$$

$$\widehat{X^Q}=\mathcal{G}^Q(V)=\mathcal{G}^Q(\mathcal{F}(X^I,X^K)).$$

In one embodiment, the G-GRU is represented by:

$$\widehat{x_{t+1}}=\widehat{x_t}+\text{G-GRU}(\widehat{x_t},V_t),$$

wherein t represents a frame.

In one embodiment, the four pathways comprise: two modal-specific pathways, including a 2D prediction pathway and a 3D prediction pathway; and two cross-modal pathways, including a 2D-to-3D prediction pathway and a 3D-to-2D prediction pathway.

In one embodiment, the loss L between the predicted future 2D and 3D pose sequences and the actual future 2D and 3D pose sequences is obtained by a weighted sum of: a first loss $L_1$ of the 2D-to-3D prediction pathway with a first weight $\lambda_1$; a second loss $L_2$ of the 3D prediction pathway with a second weight $\lambda_2$; a third loss $L_3$ of the 2D prediction pathway with a third weight $\lambda_3$; and a fourth loss $L_4$ of the 3D-to-2D prediction pathway with a fourth weight $\lambda_4$, wherein the loss L is represented by $L=\lambda_1 L_1+\lambda_2 L_2+\lambda_3 L_3+\lambda_4 L_4$.

In one embodiment, the first loss $L_1$ of the 2D-to-3D prediction pathway is: $L_1=|T_P(P)-Q|$, the second loss $L_2$ of the 3D prediction pathway is: $L_2=|P-\hat{P}|$, the third loss $L_3$ of the 2D prediction pathway is: $L_3=|Q-\hat{Q}|$, and the fourth loss $L_4$ of the 3D-to-2D prediction pathway is: $L_4=|Q-\hat{Q}|$, wherein $T_P(\cdot)$ represents a fixed projection transformation from a 3D pose to a 2D pose, P represents the actual future 3D pose sequences, Q represents the actual future 2D pose sequences, $\hat{P}$ represents the predicted future 3D pose sequences, and $\hat{Q}$ represents the predicted future 2D pose sequences.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

FIG. 2A shows schematically a block diagram of the unified HMP module according to one embodiment of the invention.

DETAILED DESCRIPTION OF THE INVENTION

Figure 1:
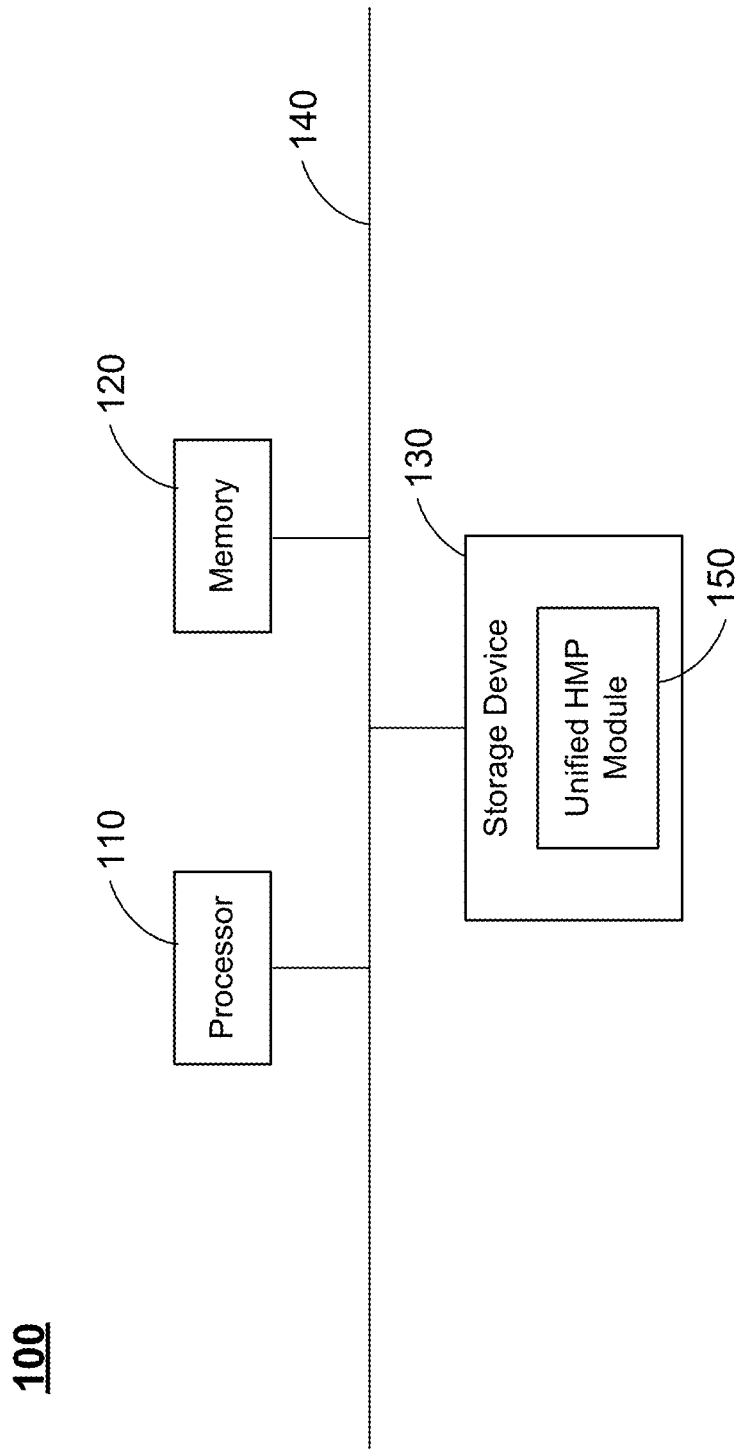
FIG. 1 shows schematically an overall architecture of a system for performing unified human motion prediction (HMP) according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this invention, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

As used herein, the phrase at least one of A, B, and C should be construed to mean a logical (A or B or C), using a non-exclusive logical OR. As used herein, the term "and/or" includes any and all combinations of one or more of the associated listed items.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The terms chip or computer chip, as used herein, generally refers to a hardware electronic component, and may refer to or include a small electronic circuit unit, also known as an integrated circuit (IC), or a combination of electronic circuits or ICs.

As used herein, the term microcontroller unit or its acronym MCU generally refers to a small computer on a single IC chip that can execute programs for controlling other devices or machines. A microcontroller unit contains one or more CPUs (processor cores) along with memory and programmable input/output (I/O) peripherals, and is usually designed for embedded applications.

The term interface, as used herein, generally refers to a communication tool or means at a point of interaction between components for performing wired or wireless data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The term code, as used herein, may include software, firmware, and/or microcode, and may refer to programs, routines, functions, classes, and/or objects. Some or all code from multiple modules may be executed using a single (shared) processor. In addition, some or all code from multiple modules may be stored by a single (shared) memory. Further, some or all code from a single module may be executed using a group of processors. Moreover, some or all code from a single module may be stored using a group of memories.

The apparatuses and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

In certain embodiments, the terms "weak supervision" or being "weakly supervised" refer to a branch of machine learning where noisy, limited, or imprecise sources are used to provide supervision signal for labeling large amounts of training data in a supervised learning setting.

In view of the existing deficiencies, the inventors propose a unified HMP mechanism (hereinafter referred to as "UniMotion") in order to fully bridge the gap between the two modalities, including the 2D and 3D poses. Specifically, certain aspects of the invention is motivated by a reference, which estimates 3D human poses from static images by aligning 2D feature in a shared latent space. Different from their spatial-only design, the approach utilized in the present invention unifies the human 2D and 3D poses both spatially and temporally. In addition, each modality in UniMotion contributes equally to learning the share feature space while theirs divides into a teacher network and a student network. The approach aligns the spatial-temporal 2D and 3D pose feature the shared latent space V. It implicitly leverages 2D knowledge to 3D tasks during training (and vice versa) until the latent space reaches a stable and robust state. With the learned shared latent space, the decoder predicts future 2D and 3D poses respectively. The 2D and 3D poses do not have to be paired, which means that the 2D pose is not necessarily a projection of the 3D pose. In this way, UniMotion can make full use of the existing 2D and 3D annotations. The strategy reduces reliance on modal-specific data in human pose problems.

FIG. 1 shows schematically an overall architecture of a system for performing unified human motion prediction (HMP) according to one embodiment of the invention. As shown in FIG. 1, the system 100 is in the form of a computing device, which includes a processor 110, a memory 120, and a storage device 130, and a bus 140 interconnecting the processor 110, the memory 120 and the storage device 130. In one embodiment, the processor 110, the memory 120 and the storage device 130 may be in the form of an ASIC. In certain embodiments, the system 100 may include necessary hardware and/or software components (not shown) to perform its corresponding tasks. Examples of these hardware and/or software components may include, but not limited to, other required memory modules, network ports, interfaces, buses, Input/Output (I/O) modules and peripheral devices, and details thereof are not elaborated herein.

The processor 110 controls operation of the system 100, which may be used to execute any computer executable code or instructions. In certain embodiments, the processor 110 may be a central processing unit (CPU), and the computer executable code or instructions being executed by the processor 110 may include an operating system (OS) and other applications, codes or instructions stored in the system 100. In certain embodiments, the system 100 may run on multiple processors, which may include any suitable number of processors.

The memory 120 may be a volatile memory module, such as the random-access memory (RAM), for storing the data and information during the operation of the system 100. In certain embodiments, the memory 120 may be in the form of a volatile memory array. In certain embodiments, the system 100 may run on more than one memory 120.

The storage device 130 is a non-volatile storage media or device for storing the computer executable code or instructions, such as the OS and the software applications for the system 100. Examples of the storage device 130 may include flash memory, memory cards, USB drives, or other types of non-volatile storage devices such as hard drives, floppy disks, optical drives, or any other types of data storage devices. In certain embodiments, the system 100 may have more than one storage device 130, and the software applications of the system 100 may be stored in the more than one storage device 130 separately.

Figure 2B:
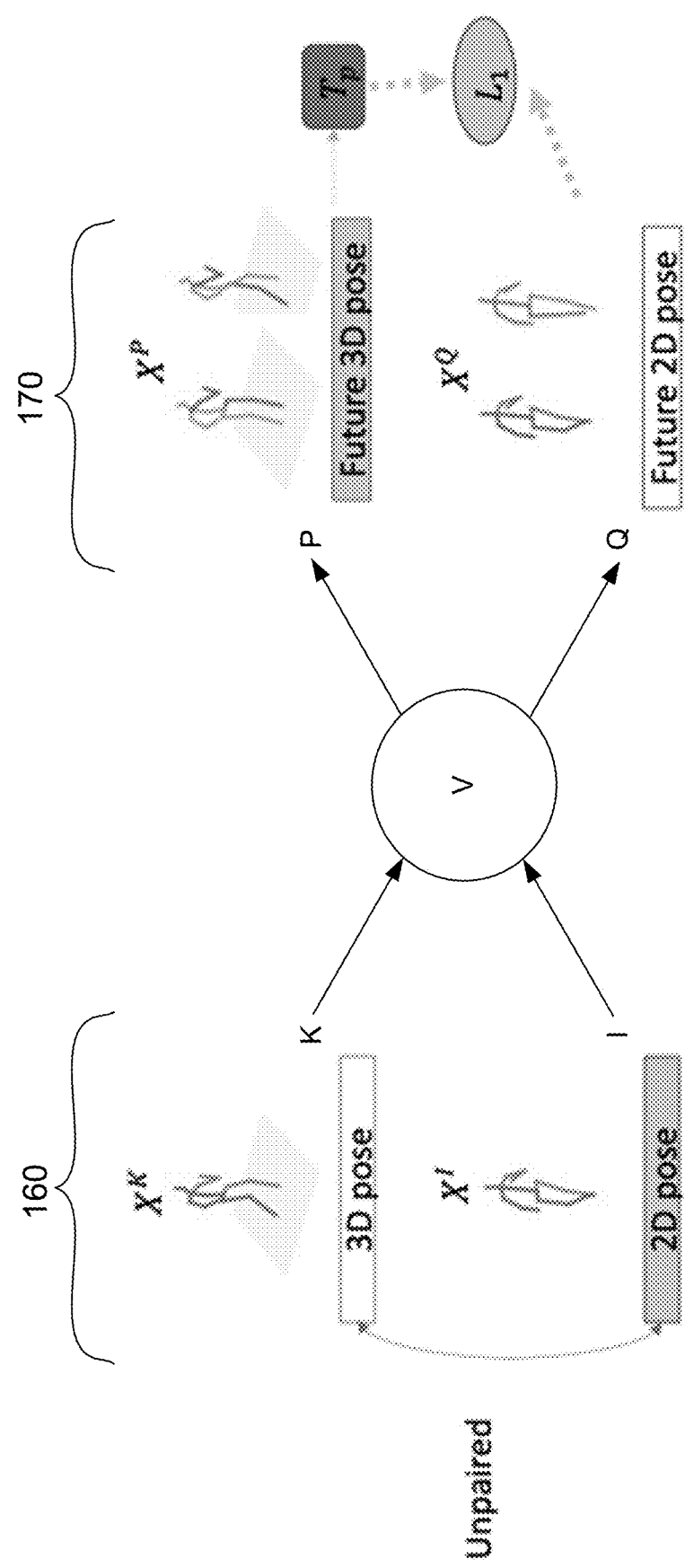
FIG. 2B shows schematically the operation of the unified HMP module as shown in FIG. 2A according to one embodiment of the invention.

As shown in FIG. 1, the computer executable code or instructions stored in the storage device 130 may include a unified HMP module 150. Specifically, the unified HMP module 150 is in the form of a software module which, when executed, allows the system 100 to perform unified HMP. FIG. 2A shows schematically a block diagram of the unified HMP module according to one embodiment of the invention, and FIG. 2B shows schematically the operation of the unified HMP module as shown in FIG. 2A according to one embodiment of the invention. As shown in FIG. 2A, the unified HMP module 150 includes an encoder 160, a shared latent space V, a decoder 170 and a database 180. The encoder 160 is used to encode a plurality of existing two-dimensional (2D) and three-dimensional (3D) pose sequences into the shared latent space V. The decoder 170 is used to predict a plurality of predicted future 2D and 3D pose sequences based on the encoded shared latent space V. In other words, the encoder 160 represents the input of the unified HMP module 150, and the decoder 170 represents the output of the unified HMP module 150. As shown in FIG. 2B, the encoder 160 and the decoder 170 form an X-shape model architecture with four pathways of knowledge flow, including two modal-specific pathways and two cross-modal pathways. Specifically, the two modal-specific pathways include a 2D prediction pathway and a 3D prediction pathway, and the two cross-modal pathways include a 2D-to-3D prediction pathway and a 3D-to-2D prediction pathway. The modal-specific pathways learn intra-modal features and their own temporal dependencies, which take 2D/3D poses as input and output poses in the same modality. The cross-modal pathways model the relationship of the two modalities, which take 2D/3D poses as input but output poses in its counterpart modality. Once the unified HMP module 150 is provided, the unified HMP module 150 and the shared latent space V may be trained in a weakly supervised manner with a plurality of input features X with a plurality of actual future 2D and 3D pose sequences by minimizing a loss L between the predicted future 2D and 3D pose sequences and the actual future 2D and 3D pose sequences. In this X-shape architecture, either 2D or 3D pose branch can be treated as a teacher network to transfer the knowledge to the other one. Training is performed alternately between the two branches. After the training process, the unified HMP module 150 may be used to perform the unified HMP using the trained encoded shared latent space V.

During the inference stage, the unified HMP module 150 is used to predict the future 3D human pose based on the past 2D/3D pose, which is a cross-modal learning problem. One of the natural approaches is to transfer the knowledge of one domain to the other one, which has been explored in various tasks, such as robotics, biomechanical, and computer animation. A typical knowledge distillation includes a pre-trained teacher network and a to-be trained student network, where the knowledge is transferred one way. In the present invention, a bidirectional knowledge distillation is utilized to allow the two modalities contribute equally.

Existing methods assume that a history motion sequence $X_{1:N}=[x_1, x_2, \ldots, x_N]$ consisting of N consecutive human poses is given, where $x_i \in R^{C \times J}$, where J is the number of joints and C denotes the dimension of the exponential map of Quaternion of each joint, so C×J denotes the number of parameters describing each pose. The goal is to predict poses $X_{N+1:N+T}$ time steps. The difference between the existing methods and the approach utilized in the present invention lies in that, in the present invention, the prediction problem is addressed with both 2D and 3D inputs and outputs.

In one embodiment, for the 3D part, given a history of N human MoCap data in terms of the exponential map of Quaternion, that is, the input features X include the existing 3D pose sequences $X^K=[x_1^K, x_2^K, \ldots, x_N^K]$, where $x_N^K \in R^{C \times J}$, the unified HMP module 150 may predict T future poses $\hat{X}^P=[\widehat{x_{N+1}^P}, \widehat{x_{N+2}^P}, \ldots, \widehat{x_{N+T}^P}]$, where $\widehat{x_t^P} \in R^{C \times J}$. For the 2D part, given a history of motion sequence in terms of 2D joint locations, that is, the existing 2D pose sequences $X^I=[x_1^I, x_2^I, \ldots, x_N^I]$, where $x_i^I \in R^{C \times J}$, the unified HMP module 150 may predict future 2D poses $\hat{X}^Q=[\widehat{x_{N+1}^Q}, \widehat{x_{N+2}^Q}, \ldots, \widehat{x_{N+T}^Q}]$, where $\widehat{x_t^Q} \in R^{C \times J}$. In this case, C=3 for 3D poses and C=2 for 2D poses. To predict $X^P$ and $X^Q$ with either $X^K$ or $X^I$, the encoder 160 must embed either $X^K$ or $X^I$ into the shared latent space V, which is represented by $V=\mathcal{F}(X^I, X^K)$. Then, the decoder 170 is a graph-based gated recurrent unit (G-GRU) $\mathcal{G}$ that narrows the difference between the predicted results (i.e., the predicted future 2D and 3D pose sequences) $\hat{X}^P(\hat{X}^Q)$ and the ground truth (i.e., the actual future 2D and 3D pose sequences) $X^P=[x_{N+1}^P, x_{N+2}^P, \ldots, x_{N+T}^P]$ ($X^Q=[x_{N+1}^Q, x_{N+2}^Q, \ldots, x_{N+T}^Q]$), and the predicted future 2D and 3D pose sequences are:

$$\widehat{X^P}=\mathcal{G}^P(V)=\mathcal{G}^P(\mathcal{F}(X^I,X^K)), \text{ and}$$

$$\widehat{X^Q}=\mathcal{G}^Q(V)=\mathcal{G}^Q(\mathcal{F}(X^I,X^K)).$$

Figure 3:
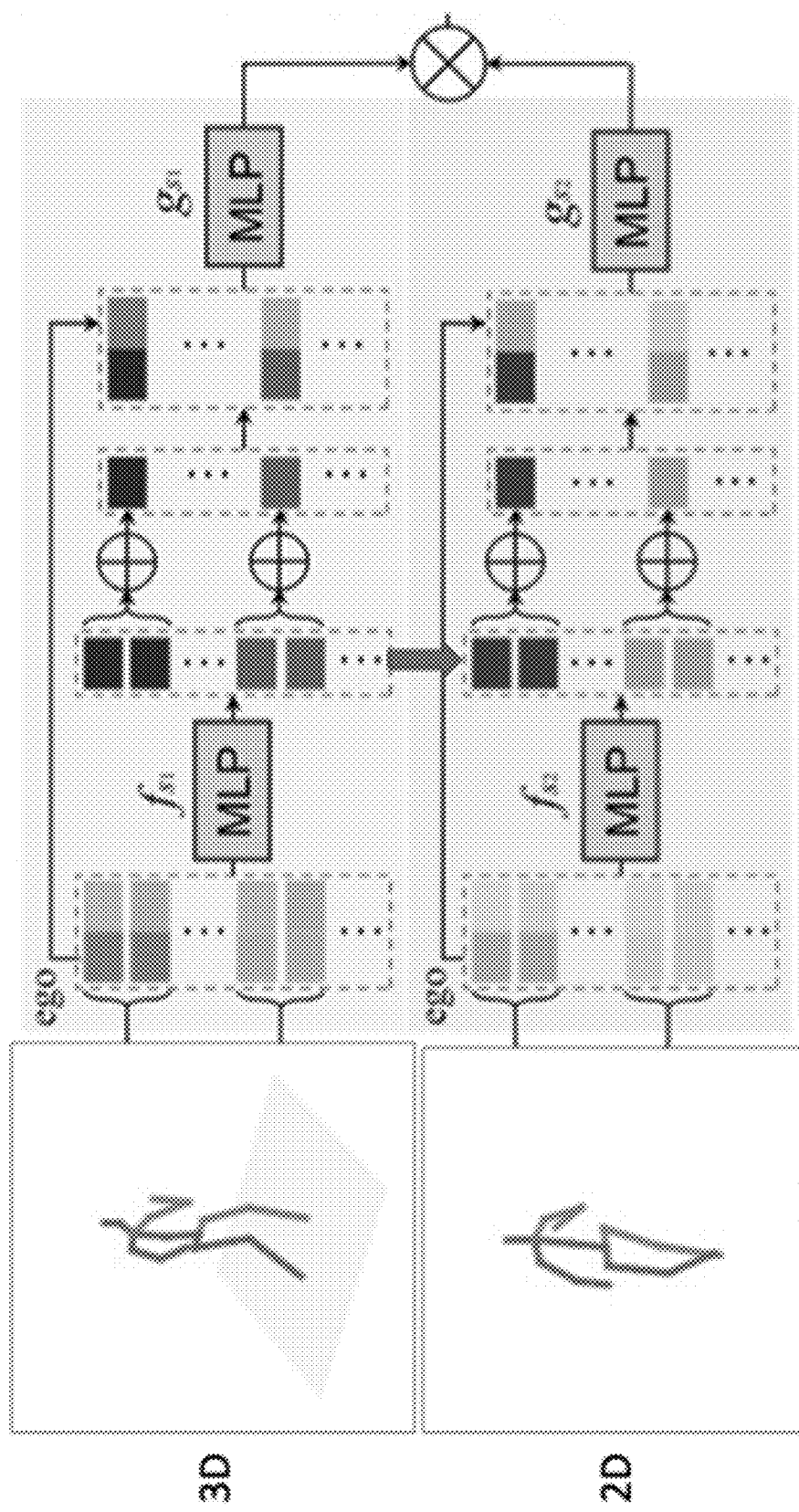
FIG. 3 shows schematically the encoder of the system as shown in FIG. 2 according to one embodiment of the invention.

FIG. 3 shows schematically the encoder of the system as shown in FIG. 2 according to one embodiment of the invention. As shown in FIG. 3, multilayer perceptron (MLP) are used in the encoder 160. In one embodiment, the encoder 160 may be a graph convolutional network (GCN) module $\mathcal{F}$, which can encode the input sequence as feature representations. Specifically, let the trainable adjacency matrix of the graph be $A \in R^{J \times J}$. A is first initialized by a body graph whose nodes are skeleton joints and edges are bone connections. For human motion prediction, the encoder 160 can be used to extract spatial and temporal features from motion sequences. Let the input feature be X, the predicted future 2D and 3D pose sequences are obtained by the GCN module is represented by:

$$\hat{X}=\text{ReLU}(AXW+XU),$$

where ReLU represents a rectified linear activation function, A is the trainable adjacency matrix, and W and U are trainable parameters.

Figure 4:
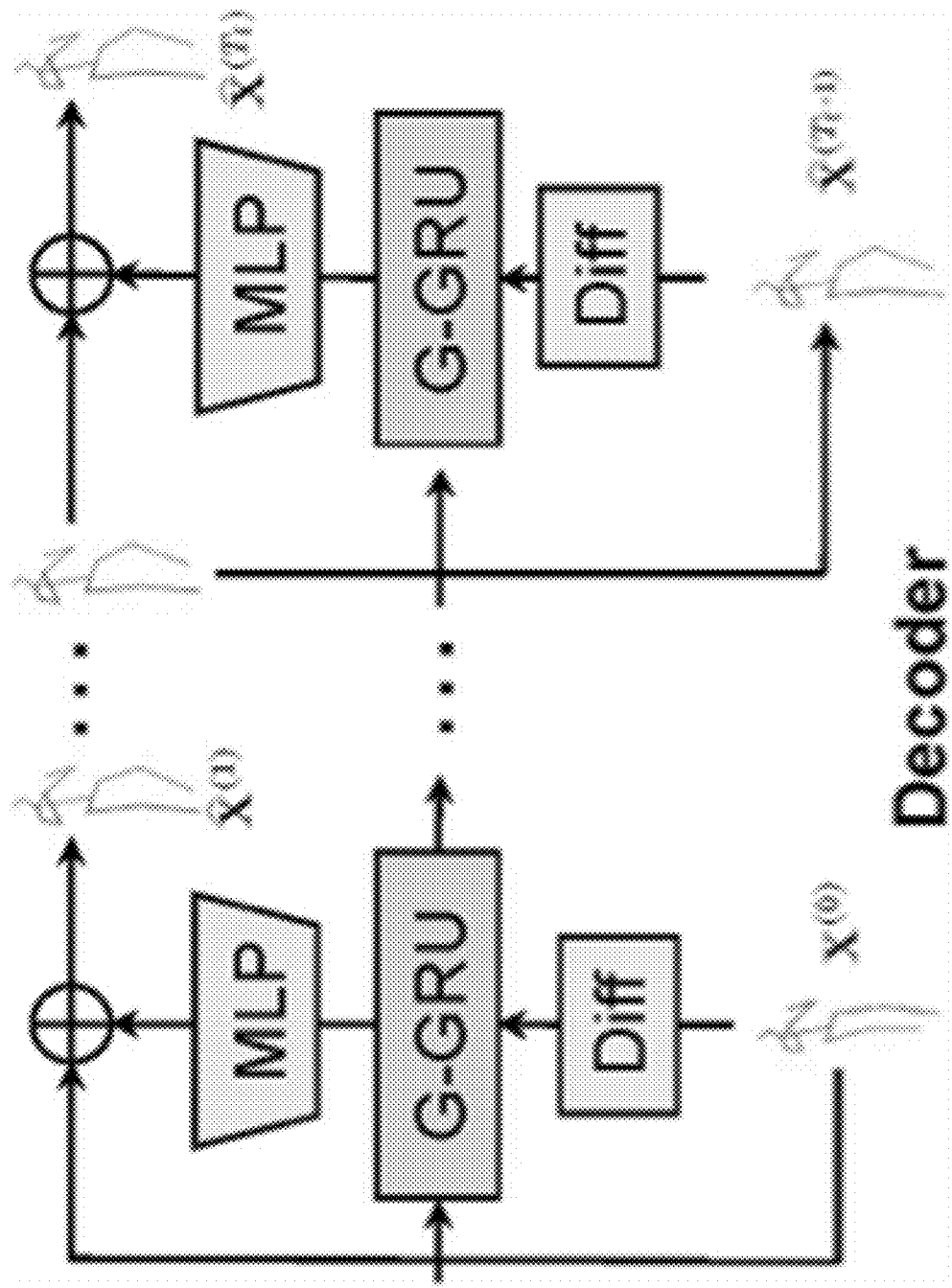
FIG. 4 shows schematically the decoder of the system as shown in FIG. 2 according to one embodiment of the invention.

To predict the future motion series, the decoder 170 may be a graph-based GRU (G-GRU) network to decode the shared latent space V. The functionality of a G-GRU is to learn and update hidden states with the guide of a graph. In operation, the system firstly computes the difference of adjacent skeleton pose as motion priors, and then feeds them into the G-GRU to update the hidden state (i.e., the shared latent space V). Then, future pose displacement is generated with an output function. Finally, the displacements is added to the input pose to predict the next frame. The hidden state vector (i.e., the shared latent space V) is regarded as the input of the G-GRU network. FIG. 4 shows schematically the decoder of the system as shown in FIG. 2 according to one embodiment of the invention. As shown in FIG. 4, at frame t, the decoder 170 (i.e., the G-GRU) is represented by:

$$\widehat{x_{t+1}}=\widehat{x_t}+\text{G-GRU}(\widehat{x_t},V_t),$$

where t represents a frame.

In certain embodiments, the learning framework is provided as a cross-modal alignment problem. Specifically, the shared latent space V embeds samples from varied modality spaces, such as 2D pose I, 3D pose K, and multi-person 3D pose P. However, in absence of labeled samples (or paired samples), an intermediate representation of the frozen teacher network is treated as the shared latent embedding. Following this, separate mapping networks are trained to encode or decode the latent representation to various source modalities. In one embodiment, the existing 2D and 3D pose sequences are not paired pose sequences. Referring back to FIG. 2B, the four pathways of knowledge flow may support an effective cross-modal training. Specifically, the multi-dimensional vector at each grid location broadly represents two important attributes, including (1) a confidence value indicating the existence of an object centroid in the corresponding input image patch upon registering the grid onto the spatial image plane; and (2) a parameterization of the object properties, such as class probabilities and attributes related to the corresponding bounding box.

As shown in FIG. 2B, some general notations for the X-shape model includes: I stands for the existing 2D pose sequences; K stands for the existing 3D pose sequences; P stands for the future 3D pose sequences; Q stands for the future 2D pose sequences; V stands for the shared latent space; and $T_P(\cdot)$ denotes the fixed projection transformation from 3D pose to 2D pose.

In one embodiment, the loss L between the predicted future 2D and 3D pose sequences and the actual future 2D and 3D pose sequences is obtained by a weighted sum of: a first loss $L_1$ of the 2D-to-3D prediction pathway with a first weight $\lambda_1$; a second loss $L_2$ of the 3D prediction pathway with a second weight $\lambda_2$; a third loss $L_3$ of the 2D prediction pathway with a third weight $\lambda_3$; and a fourth loss $L_4$ of the 3D-to-2D prediction pathway with a fourth weight $\lambda_4$, wherein the loss L is represented by $L=\lambda_1 L_1+\lambda_2 L_2+\lambda_3 L_3+\lambda_4 L_4$.

In one embodiment, the first loss $L_1$ of the 2D-to-3D prediction pathway (I→V→P) is:

$$L_1|T_P(P)-Q|,$$

In particular, The objective of 2D-to-3D pathway is to instill the knowledge of mapping an input 2D pose to the corresponding 3D pose into the newly introduced 3D pose prediction pipeline.

Further, the second loss $L_2$ of the 3D prediction pathway (K→V→P) is:

$$L_2=|P-\hat{P}|,$$

In the 3D-to-3D pathway, the objective is to predict future 3D samples via the shared latent space V. Owing to the spatially structured latent representation, for each non-spatial, the system first generates the corresponding multi-person spatial heatmap (HM) and Part Affinity Map (PAF) inline with GCN, and then computes the loss between predicted 3D pose and the ground-truth.

Further, the third loss $L_3$ of the 2D prediction pathway (I→V→Q) is:

$$L_3=|Q-\hat{Q}|, \text{ and}$$

It should be noted that the shared latent space V is the common model updated in both pathways. Here, $L_1$ is computed against the noisy teacher prediction in the 2D pose space. In contrast, $L_2$ is computed against the true ground-truth 3D pose thus devoid of the inherent 2D to 3D ambiguity. As a result of this disparity, the model differentiates between the corresponding input distributions thereby learning separate strategies favoring the corresponding learning objectives.

Lastly, the fourth loss $L_4$ of the 3D-to-2D prediction pathway (K→V→Q) is:

$$L_4=|Q-\hat{Q}|,$$

It should be noted that there is a clear limitation in the learning paradigm discussed above. The inference performance of the final model is limited by the dataset bias infused in the teacher network. It is recognized that $L_1$ is the prime culprit which limits the ability of V by not allowing it to surpass the teacher's performance. Though one can rely on $L_2$ to further improve V, this would degrade performance in the inference pathway as a result of increasing discrepancy between Q and $\hat{Q}$.

Figure 5:
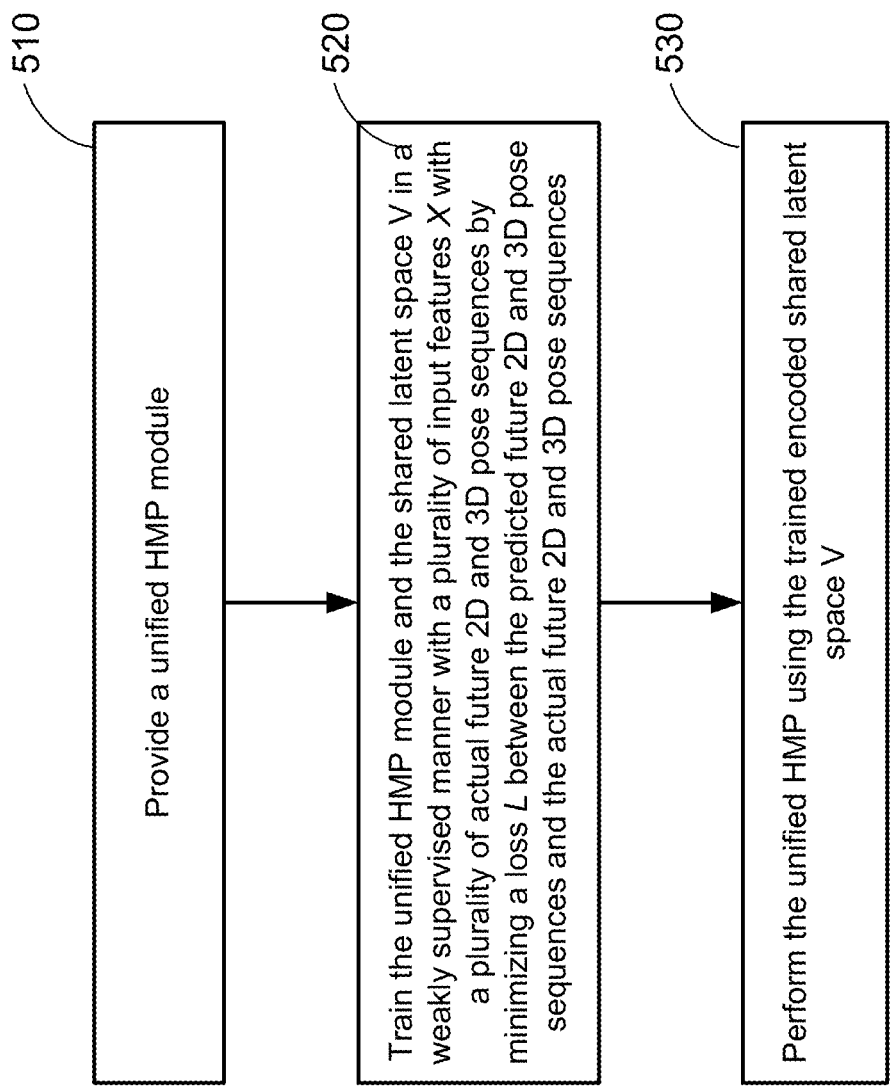
FIG. 5 shows a flowchart of a method for performing unified HMP according to certain embodiments of the invention.

In certain embodiments, the system as described above may be used to perform the method for unified HMP. For example, FIG. 5 shows a flowchart of a method for performing unified HMP according to certain embodiments of the invention. In certain embodiments, the method as shown in FIG. 5 may be implemented by the system 100 as shown in FIG. 1 and the unified HMP module as shown in FIGS. 2A and 2B. It should be particularly noted that, unless otherwise stated herein, the steps of the method may be arranged in a different sequential order, and are thus not limited to the sequential order as shown in FIG. 5.

As shown in FIG. 5, at process 510, a unified HMP module is provided. Specifically, the unified HMP module includes an encoder configured to encode a plurality of existing 2D and 3D pose sequences into a shared latent space V and a decoder configured to predict a plurality of predicted future 2D and 3D pose sequences based on the encoded shared latent space V. The encoder and the decoder form four pathways of knowledge flow. Then, at process 520, the unified HMP module and the shared latent space V are trained in a weakly supervised manner with a plurality of input features X with a plurality of actual future 2D and 3D pose sequences by minimizing a loss L between the predicted future 2D and 3D pose sequences and the actual future 2D and 3D pose sequences. In certain embodiments, the existing 2D and 3D pose sequences are not paired pose sequences. Finally, after the training, at process 530, the trained system may be used to perform the unified HMP using the trained encoded shared latent space V.

Yet another aspect of the invention provides a non-transitory tangible computer-readable medium storing instructions which, when executed by one or more processors of a system (such as the system 100 as shown in FIG. 1), cause the above disclosed method to be performed. The computer executable instructions or program codes enable the above disclosed system or a similar system, to complete various operations in accordance with the above disclosed method. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

REFERENCE LIST

[1] Jogendrea Nath Kundu, Ambareesh Revanur, Govind Vitthal Waghmare, Rahul Mysore Venkatesh, and R Venkatesh Babu, Unsupervised cross-modal alignment for multi-person 3d pose estimation, European Conference on Computer Vision, pages 35-52, 2020.

What is claimed is:

1. A system for performing unified human motion prediction (HMP), comprising:
   a computing device having a processor and a storage device storing computer executable instructions, wherein the computer executable instructions, when executed on the processor, cause the processor to:
      provide a unified HMP module, wherein the unified HMP module comprises an encoder configured to encode a plurality of existing two-dimensional (2D) and three-dimensional (3D) pose sequences into a shared latent space V and a decoder configured to predict a plurality of predicted future 2D and 3D pose sequences based on the encoded shared latent space V, and the encoder and the decoder form four pathways of knowledge flow;

train the unified HMP module and the shared latent space V in a weakly supervised manner with a plurality of input features X with a plurality of actual future 2D and 3D pose sequences by minimizing a loss L between the predicted future 2D and 3D pose sequences and the actual future 2D and 3D pose sequences; and perform the unified HMP using the trained encoded shared latent space V.

2. The system of claim 1, wherein the existing 2D and 3D pose sequences are not paired pose sequences.

3. The system of claim 1, wherein the encoder is a graph convolutional network (GCN) module $\mathcal{F}$, the input features X include the existing 3D pose sequences $X^K=[x_1^K, x_2^K, \ldots, x_N^K]$, and the existing 2D pose sequences $X^I=[x_1^I, x_2^I, \ldots, x_N^I]$, and the shared latent space V is represented by $V=\mathcal{F}(X^I, X^K)$.

4. The system of claim 3, wherein the predicted future 2D and 3D pose sequences are obtained by the GCN module is represented by:

$$\hat{X}=\text{ReLU}(AXW+XU),$$

wherein ReLU represents a rectified linear activation function, A is a trainable adjacency matrix, and W and U are trainable parameters.

5. The system of claim 3, wherein the decoder is a graph-based gated recurrent unit (G-GRU) $\mathcal{G}$, and the predicted future 2D and 3D pose sequences are:

$$\widehat{X^P} = \mathcal{G}^P(V) = \mathcal{G}^P(\mathcal{F}(X^I, X^K)), \text{ and}$$

$$\widehat{X^Q} = \mathcal{G}^Q(V) = \mathcal{G}^Q(\mathcal{F}(X^I, X^K)).$$

6. The system of claim 5, wherein the G-GRU is represented by:

$$\widehat{x_{t+1}} = \widehat{x_t} + \text{G-GRU}(\widehat{x_t}, V_t),$$

wherein t represents a frame.

7. The system of claim 1, wherein the four pathways comprise:

two modal-specific pathways, including a 2D prediction pathway and a 3D prediction pathway; and two cross-modal pathways, including a 2D-to-3D prediction pathway and a 3D-to-2D prediction pathway.

8. The system of claim 7, wherein the loss L between the predicted future 2D and 3D pose sequences and the actual future 2D and 3D pose sequences is obtained by a weighted sum of:

a first loss $L_1$ of the 2D-to-3D prediction pathway with a first weight $\lambda_1$;

a second loss $L_2$ of the 3D prediction pathway with a second weight $\lambda_2$;

a third loss $L_3$ of the 2D prediction pathway with a third weight $\lambda_3$; and a fourth loss $L_4$ of the 3D-to-2D prediction pathway with a fourth weight $\lambda_4$, wherein the loss L is represented by $L=\lambda_1 L_1+\lambda_2 L_2+\lambda_3 L_3+\lambda_4 L_4$.

9. The system of claim 8, wherein:

the first loss $L_1$ of the 2D-to-3D prediction pathway is:

$$L_1=|T_P(P)-Q|,$$

the second loss $L_2$ of the 3D prediction pathway is:

$$L_2=|P-\hat{P}|,$$

the third loss $L_3$ of the 2D prediction pathway is:

$$L_3=|Q-\hat{Q}|, \text{ and}$$

the fourth loss $L_4$ of the 3D-to-2D prediction pathway is:

$$L_4=|Q-\hat{Q}|,$$

wherein $T_P(\cdot)$ represents a fixed projection transformation from a 3D pose to a 2D pose, P represents the actual future 3D pose sequences, Q represents the actual future 2D pose sequences, $\hat{P}$ represents the predicted future 3D pose sequences, and $\hat{Q}$ represents the predicted future 2D pose sequences.

10. A method for performing unified human motion prediction (HMP), comprising:

providing a unified HMP module, wherein the unified HMP module comprises an encoder configured to encode a plurality of existing two-dimensional (2D) and three-dimensional (3D) pose sequences into a shared latent space V and a decoder configured to predict a plurality of predicted future 2D and 3D pose sequences based on the encoded shared latent space V, and the encoder and the decoder form four pathways of knowledge flow;

training the unified HMP module and the shared latent space V in a weakly supervised manner with a plurality of input features X with a plurality of actual future 2D and 3D pose sequences by minimizing a loss L between the predicted future 2D and 3D pose sequences and the actual future 2D and 3D pose sequences; and performing the unified HMP using the trained encoded shared latent space V.

11. The method of claim 10, wherein the existing 2D and 3D pose sequences are not paired pose sequences.

12. The method of claim 10, wherein the encoder is a graph convolutional network (GCN) module $\mathcal{F}$, the input features X include the existing 3D pose sequences $X^K=[x_1^K, x_2^K, \ldots, x_N^K]$, and the existing 2D pose sequences $X^I=[x_1^I, x_2^I, \ldots, x_N^I]$, and the shared latent space V is represented by $V=\mathcal{F}(X^I, X^K)$.

13. The method of claim 12, wherein the predicted future 2D and 3D pose sequences are obtained by the GCN module is represented by:

$$\hat{X}=\text{ReLU}(AXW+XU),$$

wherein ReLU represents a rectified linear activation function, A is a trainable adjacency matrix, and W and U are trainable parameters.

14. The method of claim 12, wherein the decoder is a graph-based gated recurrent unit (G-GRU) $\mathcal{G}$, and the predicted future 2D and 3D pose sequences are:

$$\widehat{X^P} = \mathcal{G}^P(V) = \mathcal{G}^P(\mathcal{F}(X^I, X^K)), \text{ and}$$

$$\widehat{X^Q} = \mathcal{G}^Q(V) = \mathcal{G}^Q(\mathcal{F}(X^I, X^K)).$$

15. The method of claim 14, wherein the G-GRU is represented by:

$$\widehat{x_{t+1}} = \widehat{x_t} + \text{G-GRU}(\widehat{x_t}, V_t),$$

wherein t represents a frame.

16. The method of claim 10, wherein the four pathways comprise:

two modal-specific pathways, including a 2D prediction pathway and a 3D prediction pathway; and two cross-modal pathways, including a 2D-to-3D prediction pathway and a 3D-to-2D prediction pathway.

17. The method of claim 16, wherein the loss L between the predicted future 2D and 3D pose sequences and the actual future 2D and 3D pose sequences is obtained by a weighted sum of:

a first loss $L_1$ of the 2D-to-3D prediction pathway with a first weight $\lambda_1$;

a second loss $L_2$ of the 3D prediction pathway with a second weight $\lambda_2$;
a third loss $L_3$ of the 2D prediction pathway with a third weight $\lambda_3$; and
a fourth loss $L_4$ of the 3D-to-2D prediction pathway with a fourth weight $\lambda_4$,
wherein the loss L is represented by $L=\lambda_1 L_1+\lambda_2 L_2+\lambda_3 L_3+\lambda_4 L_4$.

18. The method of claim 17, wherein:
the first loss $L_1$ of the 2D-to-3D prediction pathway is:

$$L_1=|T_P(P)-Q|,$$

the second loss $L_2$ of the 3D prediction pathway is:

$$L_2=|P-\hat{P}|,$$

the third loss $L_3$ of the 2D prediction pathway is:

$$L_3=|Q-\hat{Q}|, \text{ and}$$

the fourth loss $L_4$ of the 3D-to-2D prediction pathway is:

$$L_4=|Q-\hat{Q}|,$$

wherein $T_P(\cdot)$ represents a fixed projection transformation from a 3D pose to a 2D pose, P represents the actual future 3D pose sequences, Q represents the actual future 2D pose sequences, $\hat{P}$ represents the predicted future 3D pose sequences, and $\hat{Q}$ represents the predicted future 2D pose sequences.

19. A non-transitory tangible computer-readable medium storing computer executable instructions which, when executed by one or more processors, cause the method of claim 10 to be performed.

20. The non-transitory tangible computer-readable medium of claim 19, wherein the existing 2D and 3D pose sequences are not paired pose sequences.

* * * * *